United States Patent [19]

Kunz et al.

[11] Patent Number: 5,093,307
[45] Date of Patent: Mar. 3, 1992

[54] USE OF WATER-INSOLUBLE MONOAZO DYES OF THE FORMULA I

[75] Inventors: Erika Kunz, Darmstadt; Ulrich Bühler, Alzenau; Josef Ritter, Hofheim, all of Fed. Rep. of Germany

[73] Assignee: Cassella Aktiengesellschaft, Frankfurt am Main, Fed. Rep. of Germany

[21] Appl. No.: 478,915

[22] Filed: Feb. 12, 1990

[30] Foreign Application Priority Data

Feb. 23, 1989 [DE] Fed. Rep. of Germany ....... 3905527

[51] Int. Cl.$^5$ ...................... B41M 5/035; B41M 5/26
[52] U.S. Cl. .......................................... 503/227; 8/471; 428/195; 428/913; 428/914
[58] Field of Search ................ 8/471; 428/195, 913, 428/914; 503/227

[56] References Cited

FOREIGN PATENT DOCUMENTS

| | | | |
|---|---|---|---|
| 0235939 | 9/1987 | European Pat. Off. | ............ 503/227 |
| 1719073 | 12/1970 | Fed. Rep. of Germany | ...... 503/227 |
| 2756331 | 6/1979 | Fed. Rep. of Germany | ...... 503/227 |
| 60-180889 | 9/1985 | Japan | .................... 503/227 |
| 1119326 | 7/1968 | United Kingdom | ................ 503/227 |

*Primary Examiner*—Bruce H. Hess
*Attorney, Agent, or Firm*—Connolly and Hutz

[57] ABSTRACT

Use of water-insoluble monoazo dyes of the formula I

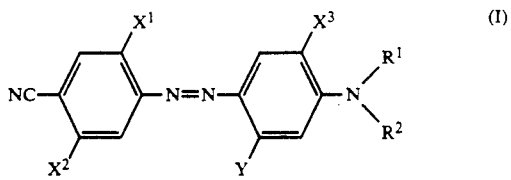

where
$X^1$ and $X^2$ are each for example chlorine,
$X^3$ is for example hydrogen, methyl or alkoxy,
Y is for example hydrogen, methyl, alkoxy or —NH-COR,
R is hydrogen or alkyl,
$R^1$ is for example hydrogen, alkyl or alkenyl, and
$R^2$ is for example alkyl or alkenyl,
in the sublimation transfer process.

9 Claims, No Drawings

USE OF WATER-INSOLUBLE MONOAZO DYES OF THE FORMULA I

USE OF DYES FOR THE SUBLIMATION TRANSFER PROCESS

The invention relates to the use of dyes of a certain structure for the sublimation transfer process. Some of the dyes used are novel, and they are claimed by the present invention together with the process for preparing them. The invention further relates to a transfer for the sublimation transfer process, to a process for the preparation thereof, and to a process for transferring dyes.

With the aid of the sublimation transfer process it is possible to produce excellent colour images, for example on plastics-coated paper or on plastics films, from image data provided by electronic image sources, such as video cameras or video recorders, from television screens, computers, electronic still cameras, etc. The electronic image data is processed in such facsimile machines, copiers or printers as contain a thermal printing head composed of numerous tiny (for example 4 to 16 per mm) heating elements arranged in a row. The digital image data is converted in the thermal printing head into various heat output levels for the individual heating elements. The heating elements are in close contact with the back of an inked ribbon which has on its front a layer of ink which contains successive (viewed in the direction of the inked ribbon) blocks which each contain a dye of the subtractive primaries yellow, magenta and cyan with or without black. The front of the inked ribbon rests with the layer of ink on the recording material on which the coloured image is to be produced. An amount of dye proportional to the heat energy supplied to the heating elements is released from the dye layer and transferred to the recording material. The inked ribbon and the recording material move past the thermal printing head. In the course of this movement, first an image is transferred line by line in one primary colour. Thereafter the full colour spectrum of the image is produced by sequential transfer of the other two primary colours and, where appropriate, black as well.

The duration of the heating pulses produced by the heating elements is of the order of milliseconds. It is generally assumed that the dye is transferred from the inked ribbon to the recording material by sublimation, although other mechanisms of dye transfer, for example dye vaporization or dye diffusion, have been postulated. The sublimation transfer process is sometimes also called the dye diffusion heat transfer process or the heat transfer printing process The above-described principle of the sublimation transfer process is of course open to numerous modifications. For instance, the inked ribbon with its three or four successive areas of primary colour can be replaced by three or four transfers which each bear one of the primaries yellow, magenta and cyan plus, where appropriate, a transfer for black.

The gradation of the colours on the ready-produced recording is influenced in a simple manner in the sublimation transfer process by controlling the heat energy emitted by the heating elements, thereby adjusting the amount of dye sublimed off and transferred to the recording material. By virtue of this easy control of colour gradation, the sublimation transfer process has advantages over other colour transfer processes. On the other hand, however, the sublimation transfer process is possible only with dyes which meet the particular requirements of this process. They include first and foremost the requirement that the dye be readily sublimable or vaporizable under the operating conditions of the sublimation transfer process, i.e. in fractions of a second, without decomposing in order to ensure adequate transfer to the recording material.

In textile transfer printing, initially a sheet of paper is printed with a multicoloured design on a paper printing press. This design is then transferred on presses or transfer calenders to a suitable textile material, usually polyester, by the uniform application of temperatures of 180° to 230° C. In contrast to the sublimation transfer process for the production of coloured recordings mentioned at the beginning, the heating times in textile transfer printing are significantly longer, usually within the range from 20 to 60 seconds. This fact and other differences between textile transfer printing and the sublimation transfer process mean that the dyes which are usable for textile transfer printing are normally unsuitable or not very suitable for the sublimation transfer process.

A dye suitable for the sublimation transfer process should have for example the following properties: it should be transferable to the recording material within a narrow temperature range and within a few milliseconds without decomposing; its resublimation on the recording material should be minimal; its image stability in the recording material should be long and high with the image being stable in particular to the action of light, moisture, chemicals, heat, rubbing and scratches and other outside factors; it must have a primary hue suitable for three- or four-colour printing and its molecular extinction coefficient should be high; and it should be readily soluble in organic solvents and provide uniform recordings. Moreover, the dye should be non-toxic, easy to prepare and readily processible into a printing ink.

None of the existing sublimation transfer process dyes, for example C.I. Disperse Red 60 and the dyes of U.S. Pat. No. 4,695,288, U.S. Pat. No. 4,764,178, DE-A-3,638,756 and DE-A-3,801,545, meet the special demands of the sublimation transfer process to an adequate extent.

The invention has for its object to specify dyes which are highly suitable for the sublimation transfer process.

This object is achieved by using monoazo dyes of the general formula I

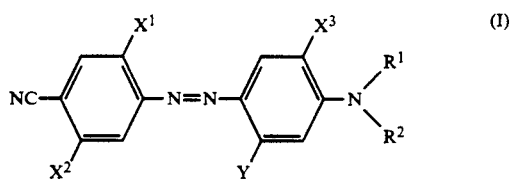

(I)

where
$X^1$ and $X^2$ are each fluorine, chlorine or bromine,
$X^3$ is hydrogen, chlorine, methyl or alkoxy of 1 to 4 carbon atoms,
Y is hydrogen, chlorine, methyl, alkoxy of 1 to 4 carbon atoms or —NHCOR,
R is hydrogen or alkyl of 1 to 6 carbon atoms,
$R^1$ is hydrogen, alkyl 1 to 6 carbon atoms, alkenyl of 3 to 5 carbon atoms, —(CH$_2$)$_n$OR$^3$ or —(CH$_2$)$_n$CN—, $R^2$ is alkyl of 1 to 6 carbon atoms, alkenyl of 3 to 5 carbon atoms, cyclopentyl, cyclohexyl, —(CH$_2$)$_m$CN or —(CH$_2$)$_m$OR$^4$, $R^3$ and $R^4$ are each alkyl of 1 to 6 carbon atoms or alkenyl of 3 to 5 carbon atoms, and n and m are each 2, 3 or 4, in the sublimation transfer process, wherein dyes are transferred from a transfer to a recording material by brief local heating.

Alkoxy $X^3$ or Y and alkyl or alkenyl R, $R^1$, $R^2$, $R^3$ or $R^4$ can be straight-chain or branched. Alkyl R, $R^1$, $R^2$, $R^3$ or $R^4$ is for example: methyl, ethyl, n-propyl, i-propyl, n-butyl, i-butyl, sec-butyl, tert-butyl, n-pentyl or n-hexyl Alkenyl $R^1$, $R^2$, $R^3$ or $R^4$ is for example 2-propenyl, 2-butenyl, 3-butenyl, 2-pentenyl, 3-pentenyl or 4-pentenyl.

$R^3$ and $R^4$ on the one hand and n and m on the other are preferably identical. Examples of —(CH$_2$)$_n$OR$^3$ or —(CH$_2$)$_m$OR$^4$— radicals $R^1$ and $R^2$ are: methoxyethyl, methoxypropyl and methoxybutyl. $R^3$ and $R^4$ are each preferably methyl or ethyl. Examples of —(CH$_2$)$_m$CN or radicals $R^1$ and $R^3$ are 2-cyanoethyl, 3-cyanopropyl and 4-cyanobutyl.

$R^1$ is preferably —(CH$_2$)$_n$OR$^3$. $R^2$ is preferably —(CH$_2$)$_m$CN or —(CH$_2$)$_m$OR$^4$. Particularly preferred $R^1$ and $R^2$ is alkyl of 2 to 4 carbon atoms Very particularly preferably, $R^1$ and $R^2$ are identical.

$X^1$ and $X^2$ are each preferably chlorine. Very particularly preferably, $X^1$ and $X^2$ are identical.

An alkoxy Y or $X^3$ of 1 to 4 carbon atoms can be for example: methoxy, ethoxy, n-propoxy or n-butoxy, of which methoxy and ethoxy are preferred.

Preferred combinations $X^3$/Y are: hydrogen/chlorine, alkoxy of 1 to 4 carbon atoms/—NHCOR, alkoxy of 1 to 4 carbon atoms/chlorine, methyl/hydrogen, alkoxy of 1 to 4 carbon atoms/hydrogen, and chlorine/hydrogen.

Particularly preferred combinations $X^3$/Y are: alkoxy of 1 to 4 carbon atoms/methyl, alkoxy of 1 to 4 carbon atoms/alkoxy of 1 to 4 carbon atoms, and chlorine/—NHCOR.

Very particularly preferred combinations $X^3$/Y are: hydrogen/—NHCOR, hydrogen/methyl, and hydrogen/alkoxy of 1 to 4 carbon atoms.

Preference is given to using monoazo dyes of the formula I where $X^1$, $X^2$, $R^1$ and $R^2$ are each as preferred and $X^3$/Y is a preferred combination.

Particular preference is given to using monoazo dyes of the formula I where $X^1$, $X^2$, $R^1$ and $R^2$ are each as particularly preferred and $X^3$/Y is a particularly preferred combination.

Very particular preference is given to using monoazo dyes of the formula I where $X^1$, $X^2$, $R^1$ and $R^2$ are eaoh as very particularly preferred and those where $X^3$/Y are very particularly preferred combinations.

Dyes of the formula I where $X^1$, $X^2$, $X^3$, Y, R and $R^1$ are each as defined except that Y cannot be methyl or —NHCOR if $R^1$ is hydrogen, alkyl of 1 to 6 carbon atoms or alkyl of 3 to 5 carbon atoms, are new and are claimed by the present invention together with the process for preparing them.

The novel dyes and the dyes used according to the invention can be prepared in a manner known per se by diazotizing an amine of the general formula II

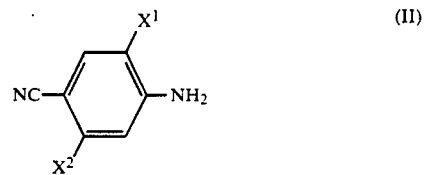

where $X^1$ and $X^2$ are each as defined above, and coupling the diazotization product onto a coupling component of the general formula III

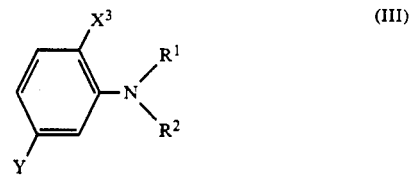

where $X^3$, Y, $R^1$ and $R^2$ are each as defined above.

The amines of the general formula II are converted into solutions of diazonium compounds in a manner known per se by the action of nitrous acid, or of other systems which form nitrozonium ions, in an acid aqueous medium, a lower alkanoic acid, for example formic acid, acetic acid or propionic acid or a mixture thereof, or an organic solvent, at temperatures of 0° to 40° C.

Coupling is likewise carried out in a manner known per se by combining the resulting solution of the diazonium compound with a solution of the coupling component at temperatures from 0° to 40° C., preferably 0° to 25° C., in a suitable solvent, for example an alkanol of 1 to 4 carbon atoms, dimethylformamide, preferably in water acidified with sulphuric acid, hydrochloric acid or phosphoric acid, or in an anhydrous water-containing lower alkanoic acid or a lower alkanoic acid mixture, in the presence or absence of an alkanol of limited miscibility with water. In some cases it can be advisable to buffer the coupling pH, for example by the addition of sodium acetate. Coupling is complete after a few hours, and the dye of the formula I can be isolated and dried in a conventional manner.

The necessary starting compounds of the general formulae II and III can be prepared from known commercial products by known methods For instance, the diazo component of the formula II is obtainable by a cyano Sandmeyer reaction from industrially available 2,5-dichloro-4-nitroaniline with subsequent Bechamp reduction or hydrogenation to the amine, or by a cyano Sandmeyer reaction with N-monoacetylated 2,5-dichloro-1,4-phenylenediamine with subsequent hydrolytic elimination of the protective acetyl group.

The dyes of the formula (I) used according to the invention for the sublimation transfer process offer in particular for example the following advantages over the dyes previously used for this purpose better and homogeneous sublimability, higher light fastness properties, higher solubilities in organic solvents, for example in MEK (methyl ethyl ketone) and toluene, and less resublimation from the recording material.

The table below shows by way of example some properties of dyes to be used according to the invention as shown in Examples 1 to 4 below compared with those of the known dye C.I. Disperse Red 60.

| Dye | Light fastness | Sublimation temperature | Solubility in MEK | Solubility in toluene |
| --- | --- | --- | --- | --- |
| Example 1 | 4–5 | 160° C. | >30 g/l | >30 g/l |
| Example 2 | 4–5 | 170° C. | >30 g/l | >30 g/l |
| Example 3 | 4 | 165° C. | >30 g/l | >30 g/l |
| Example 4 | 4 | 160° C. | >30 g/l | >30 g/l |
| C.I. Disperse Red 60 | 2–3 | 160° C. | 11 g/l | 8 g/l |

The light fastness test is carried out on a 1% polymer colouring. Irradiation is in accordance with German Standard Specification DIN 54 004. The comparison is against the eight-stage blue wool scale A rating of 1 signifies a very low light fastness.

The sublimation temperature of the dye is easily and rapidly determined as follows:

An inert substrate, for example a sheet of blotting or filter paper, is dipped into a solution, for example of 0.25% strength, of the test dye in an organic solvent, for example ethyl acetate. The colouring thus produced by dipping is dried in air. The coloured transfer is briefly heated at 100°-200° C. on a Kofler hot stage, and the dye which sublimes off transfers to a polyester film situated thereabove at a short distance (less than 1 mm) therefrom. The amount of dye transferred into the polyester film can be determined photometrically. The sublimation temperature is considered to be the temperature at which there is a clear visual evidence of colouring on the film.

The transfer required for transferring the dyes in the sublimation transfer process is prepared in a conventional manner. The dye of the formula I to be used, which may be in a mixture with one or more other dyes of the formula I and/or with one or more other dyes, is processed together with a binder or thickener into a printing ink, for example in water or in an organic solvent. Suitable organic solvents are for example methyl ethyl ketone, toluene, butanol and chlorobenzene. The printing ink may contain the dye in dispersed and/or preferably in dissolved form. In a dispersed dye, the particle size is advantageously equal to or less than 1 μm. Examples of suitable binders or thickeners are: methylcellulose, ethylcellulose, polymers of acrylic acid and methacrylic acid, polystyrene, polycarbonates, polysulphones, polyether sulphones, polyester resins, etc. The printing ink is then applied in the required coating thickness, for example 3 to 7 μm, to an inert substrate for example on a coating machine or by means of a draw bar, and is then dried. After drying, the thickness of the dye layer can be for example 0.1 to 5 μm. Suitable inert substrate materials are for example paper, such as capacitor paper, silk paper or art paper, and plastics. Suitable plastics films are made for example of polyester, e.g. polyethylene terephthalate, polyamide, polyimide or polyaramide. The substrate material may have for example a thickness of 3 to 50 μm, and it must be dense and should have a high thermal conductivity. The printing ink may contain still other ingredients in addition to those mentioned above, for example dispersants, antioxidants and/or viscosity regulators, etc. If desired, the transfer contains in a conventional manner still other layers, for example a heat-resistant slip layer on the back to improve the transport properties and the heat resistance to the heating elements of the thermal printing head.

Suitable recording materials are films made of thermostable plastics, in particular polyester, which are capable of absorbing the transferred dyes. The recording material may also be for example a paper or the like which has been coated with the aforementioned plastics, in particular polyester.

In the process for transferring dyes by sublimation, the dyes are sublimed, or vaporized, off the transfer by short-duration (for example of the order of milliseconds) local heating, for example by the heating elements of a thermal printing head, and transferred to the recording material.

The dyes used according to the invention produce on sublimation transfer strong yellowish red to reddish violet dots of colour combined to form images having very good fastness properties and showing little resublimation.

EXAMPLE 1

A strip of filter paper (Binz quality, AA, smooth, about 70 g/m$^2$) is dipped into a solution of 0.25 g of the dye of the formula

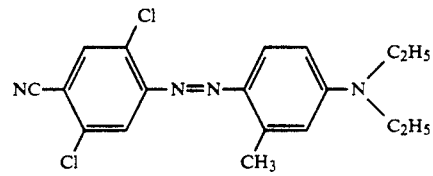

in 99.75 g of ethyl acetate for 1 minute and then dried in the air. The thermosublimation test by the method described above shows sublimation onset at 160° C.

The dye is prepared as follows:

18.7 g of 2,5-dichloro-5-aminobenzonitrile are diazotized at 15° to 20° C. in 100 ml of glacial acetic acid with 33.0 g of nitrosylsulphuric acid and coupled at 0° C. to 5° C. by the simultaneous addition of 500 g of ice onto 17.1 g of 3-methyl-N,N-dimethylaniline previously dissolved in 250 ml of water with the aid of 25 ml of crude hydrochloric acid. After the coupling has ended, the dye formed is filtered off, washed with water until neutral and dried under reduced pressure. 33.4 g are obtained of the dye, which has an absorption maximum at 518 nm.

Other novel dyes and dyes used according to the invention are prepared in a similar manner.

EXAMPLE 2

The thermosublimation test by dip-dyeing a piece of paper as described in Example 1 using the dye of the formula

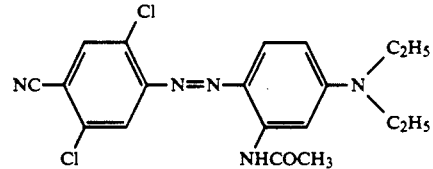

indicates sublimation onset at 170° C.

EXAMPLE 3

The thermosublimation test by dip-dyeing a piece of paper as described in Example 1 using the dye of the formula

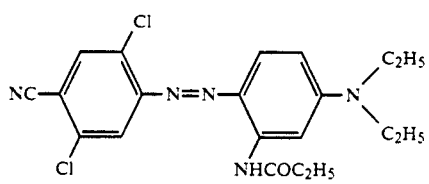

indicates sublimation onset at 165° C.

EXAMPLE 4

The thermosublimation test by dip-dyeing a piece of paper as described in Example 1 using the dye of the formula

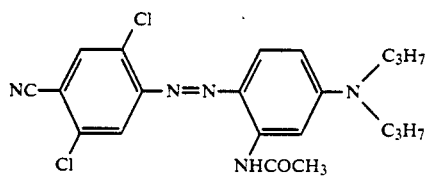

indicates sublimation onset at 160° C.

EXAMPLE 5

The thermosublimation test by dip-dyeing a piece of paper as described in Example 1 using the dye of the formula

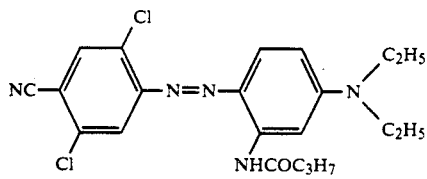

indicates sublimation onset at 155° C.

The dye is prepared as follows:

18.7 g of 2,5-dichloro-5-aminobenzonitrile are diazotized at 15° to 20° C. in 100 ml of glacial acetic acid with 33.0 g of nitrosylsulphuric acid and coupled at 0° C. to 5° C. by simultaneous addition of 500 g of ice onto 24.6 g of N-n-butyl-N',N'-diethyl-1,3-phenylenediamine previously dissolved in 250 ml of water with the aid of 25 ml of crude hydrochloric acid. After the coupling has ended, the dye formed is filtered off, washed with water until neutral and dried under reduced pressure. 38 g are obtained of the dye, which has an absorption maximum at 530 nm.

EXAMPLE 6

10 parts by weight of the dye of Example 1 are processed together with 10 parts by weight of cellulose acetate and 80 parts by weight of MEK into a homogeneous printing ink, which is then drawn down on paper with a 6 μm draw bar, and dried.

The transfer thus prepared is brought into contact on its ink-bearing side with the recording material, and a recording is transferred by means of a conventional thermal printing head applied to the back of the transfer. The rate of transfer is 8 dots/mm within 8 msec at an electrical power output of 0.25 watt/ heating element.

The recording obtained in a bluish red colour is clear and distinct, and has excellent properties.

Tables 1 to 12 below show further dyes used according to the invention, which have similar sublimation characteristics and a good fastness level.

In Tables 1 to 12, the last column indicates the hue obtained by sublimation transfer to polyester-coated paper. The numerals used have the following meanings:
1 = bluish red
2 = red
3 = yellowish red
4 = reddish violet

TABLE 1

Dyes of the formula

| Example No. | R | R¹ | R² | Hue |
|---|---|---|---|---|
| 07 | sek.C$_4$H$_9$ | C$_2$H$_5$ | C$_2$H$_5$ | 1 |
| 08 | n-C$_5$H$_{11}$ | C$_2$H$_5$ | C$_2$H$_5$ | 1 |
| 09 | CH(CH$_3$)C$_3$H$_7$ | C$_2$H$_5$ | C$_2$H$_5$ | 1 |
| 10 | CH(C$_2$H$_5$)$_2$ | C$_2$H$_5$ | C$_2$H$_5$ | 1 |
| 11 | CH$_3$ | H | n-C$_3$H$_7$ | 1 |
| 12 | C$_2$H$_5$ | n-C$_3$H$_7$ | n-C$_3$H$_7$ | 1 |
| 13 | n-C$_3$H$_7$ | n-C$_3$H$_7$ | n-C$_3$H$_7$ | 1 |
| 14 | i-C$_3$H$_7$ | n-C$_3$H$_7$ | n-C$_3$H$_7$ | 1 |
| 15 | n-C$_4$H$_9$ | n-C$_3$H$_7$ | n-C$_3$H$_7$ | 1 |
| 16 | sek.C$_4$H$_9$ | n-C$_3$H$_7$ | n-C$_3$H$_7$ | 1 |
| 17 | CH(CH$_3$)C$_3$H$_7$ | n-C$_3$H$_7$ | n-C$_3$H$_7$ | 1 |
| 18 | C$_2$H$_5$ | CH$_3$ | CH$_3$ | 1 |
| 19 | n-C$_3$H$_7$ | CH$_3$ | CH$_3$ | 1 |
| 20 | n-C$_4$H$_9$ | CH$_3$ | CH$_3$ | 1 |
| 21 | CH$_3$ | n-C$_4$H$_9$ | n-C$_4$H$_9$ | 1 |
| 22 | C$_2$H$_5$ | n-C$_4$H$_9$ | n-C$_4$H$_9$ | 1 |
| 23 | i-C$_3$H$_7$ | n-C$_4$H$_9$ | n-C$_4$H$_9$ | 1 |
| 24 | C$_2$H$_5$ | CH$_3$ | C$_2$H$_5$ | 1 |
| 25 | i-C$_3$H$_7$ | CH$_3$ | n-C$_3$H$_7$ | 1 |
| 26 | n-C$_3$H$_7$ | CH$_3$ | n-C$_3$H$_7$ | 1 |
| 27 | CH$_3$ | CH$_3$ | n-C$_4$H$_9$ | 1 |
| 28 | C$_2$H$_5$ | CH$_3$ | n-C$_4$H$_9$ | 1 |
| 29 | n-C$_3$H$_7$ | CH$_3$ | n-C$_4$H$_9$ | 1 |
| 30 | CH$_3$ | CH$_3$ | n-C$_5$H$_{11}$ | 1 |
| 31 | C$_2$H$_5$ | CH$_3$ | n-C$_6$H$_{13}$ | 1 |
| 32 | CH$_3$ | C$_2$H$_5$ | n-C$_3$H$_7$ | 1 |
| 33 | C$_2$H$_5$ | C$_2$H$_5$ | n-C$_3$H$_7$ | 1 |
| 34 | i-C$_3$H$_7$ | C$_2$H$_5$ | n-C$_3$H$_7$ | 1 |
| 35 | i-C$_4$H$_9$ | C$_2$H$_5$ | n-C$_3$H$_7$ | 1 |
| 36 | CH$_3$ | C$_2$H$_5$ | n-C$_4$H$_9$ | 1 |
| 37 | n-C$_3$H$_7$ | C$_2$H$_5$ | n-C$_4$H$_9$ | 1 |
| 38 | CH$_3$ | C$_2$H$_5$ | n-C$_5$H$_{11}$ | 1 |
| 39 | i-C$_3$H$_7$ | i-C$_3$H$_7$ | n-C$_4$H$_9$ | 1 |
| 40 | CH$_3$ | n-C$_3$H$_7$ | n-C$_6$H$_{13}$ | 1 |
| 41 | C$_2$H$_5$ | n-C$_4$H$_9$ | n-C$_5$H$_{11}$ | 1 |
| 42 | CH$_3$ | n-C$_6$H$_{13}$ | n-C$_6$H$_{13}$ | 1 |
| 43 | CH$_3$ | CH$_3$ | i-C$_3$H$_7$ | 1 |
| 44 | C$_2$H$_5$ | CH$_3$ | i-C$_3$H$_7$ | 1 |
| 45 | n-C$_3$H$_7$ | CH$_3$ | sek.C$_4$H$_9$ | 1 |
| 46 | C$_2$H$_5$ | CH$_3$ | i-C$_4$H$_9$ | 1 |
| 47 | C$_2$H$_5$ | CH$_3$ | i-C$_5$H$_{11}$ | 1 |
| 48 | CH$_3$ | CH$_3$ | C$_5$H$_{11}$-2 | 1 |
| 49 | C$_2$H$_5$ | C$_2$H$_5$ | i-C$_3$H$_7$ | 1 |
| 50 | i-C$_3$H$_7$ | C$_2$H$_5$ | i-C$_3$H$_7$ | 1 |
| 51 | CH$_3$ | C$_2$H$_5$ | i-C$_4$H$_9$ | 1 |
| 52 | n-C$_3$H$_7$ | C$_2$H$_5$ | i-C$_4$H$_9$ | 1 |
| 53 | n-C$_5$H$_{11}$ | C$_2$H$_5$ | C$_5$H$_{11}$-3 | 1 |
| 54 | CH$_3$ | n-C$_3$H$_7$ | i-C$_3$H$_7$ | 1 |
| 55 | CH(CH$_3$)C$_3$H$_7$ | n-C$_3$H$_7$ | i-C$_3$H$_7$ | 1 |
| 56 | C$_2$H$_5$ | n-C$_4$H$_9$ | i-C$_3$H$_7$ | 1 |
| 57 | CH$_3$ | n-C$_4$H$_9$ | i-C$_4$H$_9$ | 1 |
| 58 | CH$_3$ | n-C$_6$H$_{13}$ | i-C$_3$H$_7$ | 1 |
| 59 | i-C$_3$H$_7$ | i-C$_3$H$_7$ | i-C$_3$H$_7$ | 1 |
| 60 | C$_2$H$_5$ | i-C$_3$H$_7$ | i-C$_4$H$_9$ | 1 |
| 61 | CH$_3$ | i-C$_4$H$_9$ | i-C$_4$H$_9$ | 1 |

TABLE 1-continued

Dyes of the formula $$NC\text{-}C_6H_2(Cl)_2\text{-}N=N\text{-}C_6H_3(NHCOR)\text{-}N(R^1)(R^2)$$

| Example No. | R | $R^1$ | $R^2$ | Hue |
|---|---|---|---|---|
| 62 | $CH_3$ | $CH_2CH=CH_2$ | $CH_2CH=CH_2$ | 2 |
| 63 | $C_2H_5$ | $CH_2CH=CH_2$ | $CH_2CH=CH_2$ | 2 |
| 64 | $n\text{-}C_3H_7$ | $CH_2CH=CH_2$ | $CH_2CH=CH_2$ | 2 |
| 65 | $C_2H_5$ | $CH_2CH=CHCH_3$ | $CH_2CH=CHCH_3$ | 2 |
| 66 | $n\text{-}C_5H_{11}$ | $CH_2CH=CH_2$ | $CH_2CH=CH_2$ | 2 |
| 67 | $C_2H_5$ | $C(CH_3)=CH_2$ | $CH_2CH=CH_2$ | 2 |
| 68 | $i\text{-}C_3H_7$ | $CH_3$ | $CH_2CH=CH_2$ | 2 |
| 69 | $n\text{-}C_3H_7$ | $C_2H_5$ | $CH_2CH=CH_2$ | 2 |
| 70 | $C_2H_5$ | $n\text{-}C_3H_7$ | $CH_2CH=CH_2$ | 2 |
| 71 | $C_2H_5$ | $C_2H_5$ | $CH_2CH=CHCH_3$ | 2 |
| 72 | $CH_3$ | $n\text{-}C_4H_9$ | $CH_2CH=CH_2$ | 2 |
| 73 | $n\text{-}C_3H_7$ | H | $C_2H_5$ | 2 |
| 74 | $i\text{-}C_3H_7$ | H | $C_2H_5$ | 2 |
| 75 | $C_2H_5$ | H | $n\text{-}C_4H_9$ | 2 |
| 76 | $n\text{-}C_4H_9$ | H | $n\text{-}C_4H_9$ | 2 |
| 77 | $C_2H_5$ | H | $CH_2CH=CH_2$ | 3 |
| 78 | $CH_3$ | H | $i\text{-}C_3H_7$ | 2 |
| 79 | $n\text{-}C_3H_7$ | H | $i\text{-}C_3H_7$ | 2 |
| 80 | $C_4H_9\text{-}2$ | H | $i\text{-}C_3H_7$ | 2 |
| 81 | $CH_3$ | H | $i\text{-}C_4H_9$ | 2 |
| 82 | $i\text{-}C_3H_7$ | H | $i\text{-}C_4H_9$ | 2 |
| 83 | $CH_3$ | H | $sek.C_4H_9$ | 2 |
| 84 | $C_2H_5$ | H | $sek.C_4H_9$ | 2 |
| 85 | $n\text{-}C_3H_7$ | H | $sek.C_4H_9$ | 2 |
| 86 | $n\text{-}C_4H_9$ | H | $sek.C_4H_9$ | 2 |
| 87 | $CH_3$ | H | $C_5H_{11}\text{-}2$ | 2 |
| 88 | $C_2H_5$ | H | $C_5H_{11}\text{-}2$ | 2 |
| 89 | $CH_3$ | H | $C_5H_{11}\text{-}3$ | 2 |
| 90 | $i\text{-}C_3H_7$ | H | $C_5H_{11}\text{-}3$ | 2 |
| 91 | $CH_3$ | H | $cyclo\text{-}C_6H_{11}$ | 2 |
| 92 | $n\text{-}C_3H_7$ | H | $cyclo\text{-}C_6H_{11}$ | 2 |
| 93 | $C_2H_5$ | H | $cyclo\text{-}C_5H_9$ | 2 |
| 94 | $i\text{-}C_3H_7$ | H | $cyclo\text{-}C_5H_9$ | 2 |
| 95 | H | $n\text{-}C_3H_7$ | $n\text{-}C_3H_7$ | 1 |
| 96 | H | $C_2H_5$ | $n\text{-}C_3H_7$ | 1 |
| 97 | H | $n\text{-}C_4H_9$ | $n\text{-}C_4H_9$ | 1 |
| 98 | H | H | $sek.C_4H_9$ | 1 |
| 99 | H | H | $C_5H_{11}\text{-}2$ | 1 |
| 100 | H | $CH_2CH=CH_2$ | $CH_2CH=CH_2$ | 2 |
| 101 | $CH_3$ | $(CH_2)_2OCH_3$ | $(CH_2)_2OCH_3$ | 2 |
| 102 | $CH_3$ | $(CH_2)_2OCH_3$ | $(CH_2)_2CN$ | 3 |
| 103 | $CH_3$ | $(CH_2)_2OC_2H_5$ | $C_2H_5$ | 2 |
| 104 | $C_2H_5$ | $(CH_2)_2OC_2H_5$ | $C_2H_5$ | 2 |
| 105 | $n\text{-}C_3H_7$ | $(CH_2)_2OCH_3$ | $CH_2CH=CH_2$ | 2 |
| 106 | $n\text{-}C_3H_7$ | $(CH_2)_4OCH_3$ | $n\text{-}C_3H_7$ | 2 |
| 107 | $n\text{-}C_3H_7$ | $(CH_2)_2CN$ | $n\text{-}C_2H_5$ | 3 |
| 108 | $n\text{-}C_3H_7$ | $(CH_2)_3CN$ | $C_2H_5$ | 3 |

The above dyes No. 101 to 108 are new.

TABLE 2

Dyes of the formula $$NC\text{-}C_6H_2(Cl)_2\text{-}N=N\text{-}C_6H_2(Cl)(NHCOR)\text{-}N(R^1)(R^2)$$

| Example No. | R | $R^1$ | $R^2$ | Hue |
|---|---|---|---|---|
| 01 | $n\text{-}C_3H_7$ | H | $C_2H_5$ | 1 |
| 02 | $C_2H_5$ | H | $n\text{-}C_3H_7$ | 1 |
| 03 | $i\text{-}C_3H_7$ | H | $i\text{-}C_3H_7$ | 1 |
| 04 | $CH_3$ | H | $n\text{-}C_4H_9$ | 1 |
| 05 | $CH_3$ | H | $sek.C_4H_9$ | 1 |
| 06 | $C_2H_5$ | H | $sek.C_4H_9$ | 1 |
| 07 | $i\text{-}C_3H_7$ | H | $sek.C_4H_9$ | 1 |
| 08 | $n\text{-}C_3H_7$ | H | $sek.C_4H_9$ | 1 |
| 09 | $CH_3$ | H | $C_5H_{11}\text{-}2$ | 1 |
| 10 | $n\text{-}C_3H_7$ | H | $C_5H_{11}\text{-}2$ | 1 |
| 11 | $n\text{-}C_4H_9$ | H | $C_5H_{11}\text{-}2$ | 1 |
| 12 | $C_2H_5$ | H | $cyclo\text{-}C_6H_{11}$ | 1 |
| 13 | $CH_3$ | H | $cyclo\text{-}C_6H_{11}$ | 1 |
| 14 | $C_2H_5$ | H | $cyclo\text{-}C_5H_9$ | 1 |
| 15 | $C_2H_5$ | H | $C_2H_5$ | 1 |
| 16 | H | $n\text{-}C_3H_7$ | $n\text{-}C_3H_7$ | 4 |
| 17 | H | $CH_3$ | $n\text{-}C_4H_9$ | 4 |
| 18 | H | H | $C_5H_{11}\text{-}2$ | 1 |
| 19 | H | H | $CH_2CH=CH_2$ | 2 |
| 20 | H | $CH_2CH=CH_2$ | $CH_2CH=CH_2$ | 1 |
| 21 | $CH_3$ | $CH_2CH=CH_2$ | $CH_2CH=CH_2$ | 1 |
| 22 | $C_2H_5$ | $CH_2CH=CH_2$ | $CH_2CH=CHCH_3$ | 1 |
| 23 | $C_2H_5$ | $C_2H_5$ | $CH_2CH=CH_2$ | 1 |
| 24 | $CH_3$ | $(CH_2)_2CN$ | $C_2H_5$ | 2 |
| 25 | $C_2H_5$ | $(CH_2)_2CN$ | $(CH_2)_2OC_2H_5$ | 2 |
| 26 | $C_2H_5$ | $(CH_2)_2OC_2H_5$ | $(CH_2)_2OC_2H_5$ | 2 |
| 27 | $n\text{-}C_3H_7$ | $(CH_2)_2OiC_3H_7$ | $(CH_2)_2OiC_3H_7$ | 2 |
| 28 | $n\text{-}C_3H_7$ | $(CH_2)_2OCH_3$ | $n\text{-}C_3H_7$ | 2 |

The above dyes No. 24 to 28 are new.

TABLE 3

Dyes of the formula $$NC\text{-}C_6H_2(Br)_2\text{-}N=N\text{-}C_6H_3(NHCOR)\text{-}N(R^1)(R^2)$$

| Example No. | R | $R^1$ | $R^2$ | Hue |
|---|---|---|---|---|
| 01 | $CH_3$ | $C_2H_5$ | $C_2H_5$ | 1 |
| 02 | $C_2H_5$ | $C_2H_5$ | $C_2H_5$ | 1 |
| 03 | $n\text{-}C_3H_7$ | $C_2H_5$ | $C_2H_5$ | 1 |
| 04 | $n\text{-}C_6H_{13}$ | $C_2H_5$ | $C_2H_5$ | 1 |
| 05 | $CH_3$ | $n\text{-}C_3H_7$ | $n\text{-}C_3H_7$ | 1 |
| 06 | $C_2H_5$ | $n\text{-}C_3H_7$ | $n\text{-}C_3H_7$ | 1 |
| 07 | $n\text{-}C_3H_7$ | $n\text{-}C_3H_7$ | $n\text{-}C_3H_7$ | 1 |
| 08 | $i\text{-}C_3H_7$ | $n\text{-}C_3H_7$ | $n\text{-}C_3H_7$ | 1 |
| 09 | $sec\ C_4H_9$ | $n\text{-}C_3H_7$ | $n\text{-}C_3H_7$ | 1 |
| 10 | $i\text{-}C_4H_9$ | $n\text{-}C_3H_7$ | $n\text{-}C_3H_7$ | 1 |
| 11 | $C_2H_5$ | $CH_3$ | $CH_3$ | 1 |
| 12 | $n\text{-}C_4H_9$ | $CH_3$ | $CH_3$ | 1 |
| 13 | $CH_3$ | $n\text{-}C_4H_9$ | $n\text{-}C_4H_9$ | 1 |
| 14 | $C_2H_5$ | $n\text{-}C_4H_9$ | $n\text{-}C_4H_9$ | 1 |
| 15 | $CH_3$ | $CH_3$ | $n\text{-}C_3H_7$ | 1 |
| 16 | $n\text{-}C_3H_7$ | $CH_3$ | $n\text{-}C_3H_7$ | 1 |
| 17 | $n\text{-}C_4H_9$ | $CH_3$ | $n\text{-}C_4H_9$ | 1 |
| 18 | $C_2H_5$ | $C_2H_5$ | $n\text{-}C_3H_7$ | 1 |
| 19 | $i\text{-}C_3H_7$ | $C_2H_5$ | $n\text{-}C_3H_7$ | 1 |
| 20 | $C_2H_5$ | $C_2H_5$ | $n\text{-}C_5H_{11}$ | 1 |
| 21 | $CH_3$ | $n\text{-}C_3H_7$ | $n\text{-}C_4H_9$ | 1 |
| 22 | $C_2H_5$ | $n\text{-}C_4H_9$ | $n\text{-}C_5H_{11}$ | 1 |
| 23 | $CH_3$ | $n\text{-}C_5H_{11}$ | $n\text{-}C_5H_{11}$ | 1 |
| 24 | $C_2H_5$ | $CH_3$ | $i\text{-}C_3H_7$ | 1 |
| 25 | $i\text{-}C_3H_7$ | $CH_3$ | $i\text{-}C_4H_9$ | 1 |
| 26 | $CH_3$ | $CH_3$ | $C_5H_{11}\text{-}3$ | 1 |
| 27 | $n\text{-}C_4H_9$ | $C_2H_5$ | $i\text{-}C_4H_9$ | 1 |
| 28 | $C_2H_5$ | $n\text{-}C_4H_9$ | $i\text{-}C_4H_9$ | 1 |
| 29 | $CH_3$ | $n\text{-}C_4H_9$ | $C_5H_{11}\text{-}2$ | 1 |

TABLE 3-continued

Dyes of the formula $$\text{NC-C}_6\text{H}_2(\text{Br})_2\text{-N=N-C}_6\text{H}_3(\text{NHCOR})\text{-NR}^1\text{R}^2$$

| Example No. | R | R$^1$ | R$^2$ | Hue |
|---|---|---|---|---|
| 30 | C$_2$H$_5$ | CH$_2$CH=CH$_2$ | CH$_2$CH=CH$_2$ | 2 |
| 31 | n-C$_3$H$_7$ | CH$_2$CH=CH$_2$ | CH$_2$CH=CH$_2$ | 2 |
| 32 | CH$_3$ | CH$_2$CH=CHCH$_3$ | CH$_2$CH=CH$_2$ | 2 |
| 33 | C$_2$H$_5$ | C$_2$H$_5$ | CH$_2$CH=CH$_2$ | 2 |
| 34 | C$_2$H$_5$ | n-C$_3$H$_7$ | CH$_2$CH=CH$_2$ | 2 |
| 35 | i-C$_3$H$_7$ | H | n-C$_3$H$_7$ | 2 |
| 36 | n-C$_3$H$_7$ | H | i-C$_3$H$_7$ | 2 |
| 37 | C$_2$H$_5$ | H | i-C$_3$H$_7$ | 2 |
| 38 | i-C$_4$H$_9$ | H | i-C$_4$H$_9$ | 2 |
| 39 | n-C$_3$H$_7$ | H | i-C$_4$H$_9$ | 2 |
| 40 | C$_2$H$_5$ | H | sek.C$_4$H$_9$ | 2 |
| 41 | CH$_3$ | H | sek.C$_4$H$_9$ | 2 |
| 42 | i-C$_3$H$_7$ | H | sek.C$_4$H$_9$ | 2 |
| 43 | C$_2$H$_5$ | H | C$_5$H$_{11}$-2 | 2 |
| 44 | n-C$_3$H$_7$ | H | C$_5$H$_{11}$-2 | 2 |
| 45 | i-C$_3$H$_7$ | H | C$_5$H$_{11}$-2 | 2 |
| 46 | CH$_3$ | H | C$_5$H$_{11}$-3 | 2 |
| 47 | n-C$_4$H$_9$ | H | C$_5$H$_{11}$-3 | 2 |
| 48 | CH$_3$ | H | cyclo-C$_6$H$_{11}$ | 2 |
| 49 | n-C$_3$H$_7$ | H | cyclo-C$_6$H$_{11}$ | 2 |
| 50 | CH$_3$ | (CH$_2$)$_2$OCH$_3$ | (CH$_2$)$_4$OCH$_3$ | 1 |
| 51 | C$_2$H$_5$ | (CH$_2$)$_2$OC$_2$H$_5$ | C$_2$H$_5$ | 1 |
| 52 | n-C$_3$H$_7$ | (CH$_2$)$_2$OnC$_3$H$_7$ | (CH$_2$)$_2$CN | 2 |
| 53 | n-C$_3$H$_7$ | (CH$_2$)$_3$CN | n-C$_3$H$_7$ | 2 |
| 54 | n-C$_3$H$_7$ | (CH$_2$)$_2$CN | (CH$_2$)$_2$CN | 3 |
| 55 | i-C$_3$H$_7$ | (CH$_2$)$_4$OCH$_3$ | (CH$_2$)$_4$OCH$_3$ | 2 |

The above dyes No. 50 to 55 are new.

TABLE 4

Dyes of the formula $$\text{NC-C}_6\text{H}_2(\text{Br})_2\text{-N=N-C}_6\text{H}_2(\text{Cl})(\text{NHCOR})\text{-NR}^1\text{R}^2$$

| Example No. | R | R$^1$ | R$^2$ | Hue |
|---|---|---|---|---|
| 01 | C$_2$H$_5$ | C$_2$H$_5$ | C$_2$H$_5$ | 4 |
| 02 | n-C$_3$H$_7$ | n-C$_3$H$_7$ | n-C$_3$H$_7$ | 4 |
| 03 | i-C$_3$H$_7$ | n-C$_3$H$_7$ | n-C$_3$H$_7$ | 4 |
| 04 | n-C$_3$H$_7$ | H | n-C$_3$H$_7$ | 1 |
| 05 | C$_2$H$_5$ | H | i-C$_3$H$_7$ | 1 |
| 06 | C$_2$H$_5$ | H | i-C$_4$H$_9$ | 1 |
| 07 | CH$_3$ | H | sec.C$_4$H$_9$ | 1 |
| 08 | C$_2$H$_5$ | H | sec.C$_4$H$_9$ | 1 |
| 09 | n-C$_3$H$_7$ | H | sec.C$_4$H$_9$ | 1 |
| 10 | CH$_3$ | H | C$_5$H$_{11}$-2 | 1 |
| 11 | i-C$_3$H$_7$ | H | C$_5$H$_{11}$-2 | 1 |
| 12 | n-C$_3$H$_7$ | H | C$_5$H$_{11}$-3 | 1 |
| 13 | i-C$_3$H$_7$ | H | (CH$_2$)$_3$CN | 2 |
| 14 | n-C$_3$H$_7$ | (CH$_2$)$_2$CN | (CH$_2$)$_2$OC$_2$H$_5$ | 2 |

The above dyes No. 13 and 14 are new.

TABLE 5

Dyes of the formula $$\text{NC-C}_6\text{H}_2(\text{Br})(\text{Cl})\text{-N=N-C}_6\text{H}_3(\text{NHCOR})\text{-NR}^1\text{R}^2$$

| Example No. | R | R$^1$ | R$^2$ | Hue |
|---|---|---|---|---|
| 01 | CH$_3$ | n-C$_3$H$_7$ | n-C$_3$H$_7$ | 1 |
| 02 | C$_2$H$_5$ | C$_2$H$_5$ | C$_2$H$_5$ | 1 |
| 03 | n-C$_3$H$_7$ | C$_2$H$_5$ | C$_2$H$_5$ | 1 |
| 04 | C$_2$H$_5$ | H | sec.C$_4$H$_9$ | 1 |
| 05 | CH$_3$ | CH$_2$CH=CH$_2$ | CH$_2$CH=CH$_2$ | 2 |
| 06 | C$_2$H$_5$ | (CH$_2$)$_2$OC$_2$H$_5$ | (CH$_2$)$_2$OC$_2$H$_5$ | 2 |

The above dye No. 6 is new

TABLE 6

Dyes of the formula $$\text{NC-C}_6\text{H}_2(\text{Cl})(\text{Br})\text{-N=N-C}_6\text{H}_3(\text{NHCOR})\text{-NR}^1\text{R}^2$$

| Example No. | R | R$^1$ | R$^2$ | Hue |
|---|---|---|---|---|
| 01 | CH$_3$ | C$_2$H$_5$ | C$_2$H$_5$ | 1 |
| 02 | i-C$_3$H$_7$ | C$_2$H$_5$ | C$_2$H$_5$ | 1 |
| 03 | C$_2$H$_5$ | C$_2$H$_5$ | n-C$_3$H$_7$ | 1 |
| 04 | n-C$_4$H$_9$ | H | C$_5$H$_{11}$-2 | 2 |
| 05 | n-C$_3$H$_7$ | (CH$_2$)$_2$OCH$_3$ | (CH$_2$)$_2$CN | 2 |

The above dye No. 5 is new

TABLE 7

Dyes of the formula $$\text{NC-C}_6\text{H}_2(\text{F})_2\text{-N=N-C}_6\text{H}_3(\text{NHCOR})\text{-NR}^1\text{R}^2$$

| Example No. | R | R$^1$ | R$^2$ | Hue |
|---|---|---|---|---|
| 01 | C$_2$H$_5$ | C$_2$H$_5$ | C$_2$H$_5$ | 2 |
| 02 | C$_2$H$_5$ | CH$_2$CH=CH$_2$ | CH$_2$CH=CH$_2$ | 3 |
| 03 | i-C$_3$H$_7$ | C$_2$H$_5$ | i-C$_4$H$_9$ | 3 |
| 04 | n-C$_3$H$_7$ | H | cyclo-C$_5$H$_9$ | 3 |
| 05 | i-C$_4$H$_9$ | H | n-C$_4$H$_9$ | 3 |
| 06 | CH$_3$ | n-C$_3$H$_7$ | n-C$_3$H$_7$ | 2 |
| 07 | n-C$_3$H$_7$ | C$_2$H$_5$ | C$_2$H$_5$ | 2 |
| 08 | CH$_3$ | C$_2$H$_5$ | (CH$_2$)$_2$OC$_2$H$_5$ | 3 |
| 09 | n-C$_3$H$_7$ | n-C$_3$H$_7$ | (CH$_2$)$_2$CN | 3 |
| 10 | i-C$_3$H$_7$ | (CH$_2$)$_2$OCH$_3$ | (CH$_2$)$_2$OCH$_3$ | 3 |

The above dyes No. 8 to 10 are new.

TABLE 8

Dyes of the formula

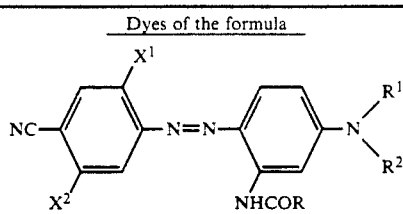

| Example No. | $X^1$ | $X^2$ | $X^3$ | R | $R^1$ | $R^2$ | Hue |
|---|---|---|---|---|---|---|---|
| 01 | F | F | Cl | H | H | $C_5H_{11}$-2 | 3 |
| 02 | F | F | Cl | $C_2H_5$ | H | sec.$C_4H_9$ | 3 |
| 03 | Br | Cl | Cl | $CH_3$ | H | $C_5H_{11}$-3 | 1 |
| 04 | Cl | Cl | $OCH_3$ | $CH_3$ | H | sec.$C_4H_9$ | 1 |
| 05 | F | F | $OCH_3$ | $CH_3$ | H | sec.$C_4H_9$ | 1 |
| 06 | Cl | Cl | $OCH_3$ | $C_2H_5$ | H | $C_5H_{11}$-3 | 1 |
| 07 | Cl | Cl | $OCH_3$ | $C_3H_7$ | H | $C_5H_{11}$-2 | 1 |
| 08 | Cl | Br | Cl | n-$C_3H_7$ | $CH_3$ | i-$C_4H_9$ | 4 |
| 09 | Cl | Br | Cl | $C_2H_5$ | H | i-$C_3H_7$ | 1 |
| 10 | Br | F | H | $CH_3$ | n-$C_3H_7$ | n-$C_3H_7$ | 2 |
| 11 | F | Br | H | n-$C_5H_{11}$ | H | n-$C_5H_{11}$ | 2 |
| 12 | Cl | F | H | $CH_3$ | n-$C_4H_9$ | n-$C_4H_9$ | 2 |
| 13 | Cl | F | H | $C_2H_5$ | $C_2H_5$ | n-$C_3H_7$ | 2 |
| 14 | F | Cl | Cl | n-$C_3H_7$ | H | sec.$C_4H_9$ | 2 |
| 15 | F | Cl | H | $C_2H_5$ | $CH_2CH=CH_2$ | $CH_2CH=CH_2$ | 2 |

TABLE 9

Dyes of the formula

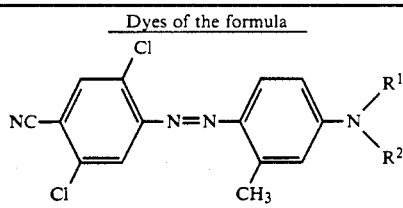

| Example No. | $R^1$ | $R^2$ | Hue |
|---|---|---|---|
| 01 | $(CH_2)_2OC_2H_5$ | $CH_2)_2OC_2H_5$ | 2 |
| 02 | n-$C_3H_7$ | n-$C_3H_7$ | 2 |
| 03 | n-$C_4H_9$ | n-$C_4H_9$ | 2 |
| 04 | n-$C_6H_{13}$ | n-$C_6H_{13}$ | 2 |
| 05 | $CH_2CH=CH_2$ | $CH_2CH=CH_2$ | 3 |
| 06 | $CH_2CH=CHCH_3$ | $CH_2CH=CHCH_3$ | 3 |
| 07 | $CH_3$ | n-$C_3H_7$ | 2 |
| 08 | $C_2H_5$ | n-$C_4H_9$ | 2 |
| 09 | $C_2H_5$ | i-$C_4H_9$ | 2 |
| 10 | $C_2H_5$ | $CH_2CH=CH_2$ | 2 |
| 11 | n-$C_3H_7$ | $CH_2CH=CH_2$ | 2 |
| 12 | $(CH_2)_2OC_2H_5$ | $(CH_2)_2OC_2H_5$ | 3 |
| 13 | $C_3H_7$ | $(CH_2)_2CN$ | 2 |
| 14 | $(CH_2)_2OCH_3$ | $(CH_2)_2CN$ | 2 |

The above dyes No. 12 to 14 are new.

TABLE 10

Dyes of the formula

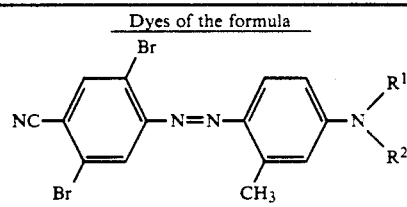

| Example No. | $R^1$ | $R^2$ | Hue |
|---|---|---|---|
| 01 | $CH_3$ | i-$C_4H_9$ | 2 |
| 02 | $C_2H_5$ | $C_2H_5$ | 1 |
| 03 | n-$C_3H_7$ | n-$C_3H_7$ | 1 |
| 04 | n-$C_5H_{11}$ | n-$C_5H_{11}$ | 1 |
| 05 | $CH_2CH=CH_2$ | $CH_2CH=CH_2$ | 2 |
| 06 | $CH_3$ | n-$C_4H_9$ | 2 |
| 07 | n-$C_3H_7$ | i-$C_3H_7$ | 2 |
| 08 | $C_2H_5$ | $CH_2CH=CHCH_3$ | 3 |
| 09 | $(CH_2)_2OCH$ | $(CH_2)_2OCH_3$ | 2 |
| 10 | $C_2H_5$ | $(CH_2)_2CN$ | 2 |

The above dyes No. 09 and are new.

TABLE 11

Dyes of the formula

| Example No. | $X^3$ | Y | $R^1$ | $R^2$ | Hue |
|---|---|---|---|---|---|
| 01 | H | Cl | $C_2H_5$ | $C_2H_5$ | 2 |
| 02 | H | $OCH_3$ | $C_3H_7$ | $C_3H_7$ | 1 |
| 03 | $OCH_3$ | $CH_3$ | $C_2H_5$ | $C_2H_5$ | 1 |
| 04 | $OCH_3$ | $CH_3$ | $(CH_2)_2OC_2H_5$ | $C_4H_9$ | 1 |
| 05 | $OCH_3$ | $CH_3$ | H | i$C_3H_7$ | 1 |
| 06 | $OCH_3$ | $CH_3$ | $CH_3$ | i$C_3H_7$ | 1 |
| 07 | $CH_3$ | $NHCOCH_3$ | H | i$C_4H_9$ | 1 |
| 08 | $CH_3$ | $NHCOC_2H_5$ | H | i$C_3H_7$ | 1 |

TABLE 11-continued

Dyes of the formula

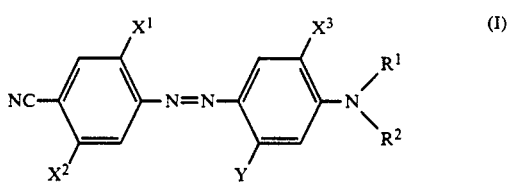

| Example No. | $X^3$ | Y | $R^1$ | $R^2$ | Hue |
|---|---|---|---|---|---|
| 09 | $CH_3$ | $NHCOC_3H_7$ | H | $CH_2CH=CH_2$ | 2 |
| 10 | H | $OCH_3$ | $CH_2CH=CH_2$ | $CH_2CH=CH_2$ | 2 |
| 11 | H | $OCH_3$ | $(CH_2)_2OC_2H_5$ | $C_2H_5$ | 2 |
| 12 | H | $OCH_3$ | $n-C_3H_7$ | $(CH_2)_3CN$ | 2 |
| 13 | $OCH_3$ | $CH_3$ | $CH_2CH=CH_2$ | $CH_2CH=CH_2$ | 2 |
| 14 | $OCH_3$ | $CH_3$ | $CH_2CH=CH_2$ | $(CH_2)_2CN$ | 3 |

The above dyes No. 10 to 14 are new.

TABLE 12

Dyes of the formula

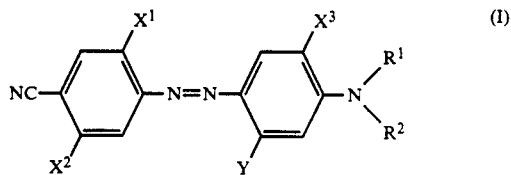

| Example No. | $X^3$ | Y | $R^1$ | $R^2$ | Hue |
|---|---|---|---|---|---|
| 01 | H | Cl | $C_2H_5$ | $C_2H_5$ | 2 |
| 02 | H | $OCH_3$ | $C_3H_7$ | $C_3H_7$ | 1 |
| 03 | $OCH_3$ | $CH_3$ | H | $C_2H_5$ | 1 |
| 04 | $CH_3$ | $NHCOCH_3$ | H | $iC_4H_9$ | 1 |
| 05 | $OCH_3$ | $CH_3$ | H | $iC_3H_7$ | 1 |
| 06 | H | $OCH_3$ | $C_2H_5$ | $CH_2CH=CH_2$ | 2 |
| 07 | H | $OCH_3$ | $(CH_2)_2OnC_3H_7$ | $(CH_2)_2OnC_3H_7$ | 2 |
| 08 | $OCH_3$ | $CH_3$ | $CH_2CH=CH_2$ | $CH_2CH=CH_2$ | 2 |
| 09 | $OCH_3$ | $CH_3$ | $(CH_2)_2OCH_3$ | $C_2H_5$ | 2 |

The above dyes No. 6 to 9 are new.

We claim:

1. A sublimation transfer process, characterized in that a dye of the general formula I $$\text{(I)}$$

where $X^1$ and $X^2$ are each fluorine, chlorine or bromine, $X^3$ is hydrogen, chlorine, methyl or alkoxy of 1 to 4 carbon atoms, Y is hydrogen, chlorine, methyl, alkoxy of 1 to 4 carbon atoms or —NHCOR, R is hydrogen or alkyl of 1 to 6 carbon atoms, $R^1$ is hydrogen, alkyl of 1 to 6 carbon atoms, alkenyl of 3 to 5 carbon atoms, —[—$(CH)_2C-N$]—$(CH_2)_nCN$, $R^2$ is alkyl of 1 to 6 carbon atoms, alkenyl of 3 to 5 carbon atoms, cyclopentyl, cyclohexyl, —$(CH_2)_mCN$ or —$(CH_2)_mOR^4$, $R^3$ and $R^4$ are each alkyl of 1 to 6 carbon atoms or alkenyl of 3 to 5 carbon atoms, and n and m are each 2, 3 or 4, or a mixture of dyes of formula I with or without the addition of other dyes is applied to a transfer substrate and the dye thereon is transferred by sublimation to the material to be colored.

2. A process according to claim 1, characterized in that $X^1$ and $X^2$ are identical and denote bromine.

3. A process according to claim 1, characterized in that $X^1$ and $X^2$ identical and denote chlorine.

4. A process according to claim 1, characterized in that $R^1$ and/or $R^2$ is linear alkyl of 1 to 4 carbon atoms or allyl.

5. A process according to claim 1, characterized in that $R^1$ and $R^2$ are identical.

6. A process according to claim 1, characterized in that $X^3$ is hydrogen.

7. Transfer substrate for the sublimation transfer process, characterized in that it bears a layer which contains a dye of the general formula I $$\text{(I)}$$

where $X^1$ and $X^2$ are each fluorine, chlorine or bromine, $X^3$ is hydrogen, chlorine, methyl or alkoxy of 1 to 4 carbon atoms, Y is hydrogen, chlorine, methyl, alkoxy of 1 to 4 carbon atoms or —NHCOR, R is hydrogen or alkyl of 1 to 6 carbon atoms, $R^1$ is hydrogen, alkyl of 1 to 6 carbon atoms, alkenyl of 3 to 5 carbon atoms, —$(CH_2)_nOR^3$ or —$(CH_2)_nCN$—, $R^2$ is alkyl of 1 to 6 carbon atoms, alkenyl of 3 to 5 carbon atoms, cyclopentyl, cyclohexyl, —$(CH_2)_mCN$ or —$(CH_2)_mOR^4$, $R^3$ and $R^4$ are each alkyl of 1 to 6 carbon atoms or alkenyl of 3 to 5 carbon atoms, and n and m are each 2, 3 or 4, or a mixture of dyes of formula I with or without the addition of other dyes.

8. Process for preparing transfer substrates characterized in that a substrate material is coated with a printing ink which contains a dye of the general formula I

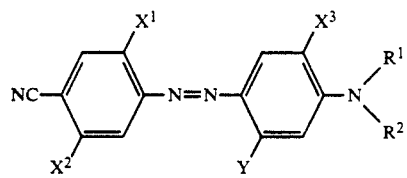

where $X^1$ and $X^2$ are each fluorine, chlorine or bromine, $X^3$ is hydrogen, chlorine, methyl or alkoxy of 1 to 4 carbon atoms, Y is hydrogen, chlorine, methyl, alkoxy of 1 to 4 carbon atoms or —NHCOR, R is hydrogen or alkyl of 1 to 6 carbon atoms, $R^1$ is hydrogen, alkyl of 1 to 6 carbon atoms, alkenyl of 3 to 5 carbon atoms, —$(CH_2)_nOR^3$ or —$(CH_2)_nCN$—, $R^2$ is alkyl of 1 to 6 carbon atoms, alkenyl of 3 to 5 carbon atoms, cyclopentyl, cyclohexyl, —$(CH_2)_mCN$ or —$(CH_2)_mOR^4$, $R^3$ and $R^4$ are each alkyl of 2 to 6 carbon atoms or alkenyl of 3 to 5 carbon atoms, and n and m are each 2, 3 or 4, or a mixture of dyes of formula I with or without the addition of other dyes.

9. Process for transferring dyes from a transfer to a recording material by brief local heating, characterized in that the transfer substrate used bears a dye of the general formula I

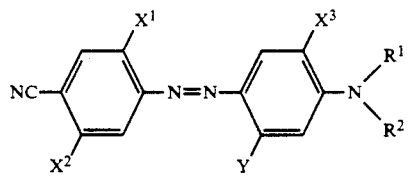

where $X^1$ and $X^2$ are each fluorine, chlorine or bromine, $X^3$ is hydrogen, chlorine, methyl or alkoxy of 1 to 4 carbon atoms, Y is hydrogen, chlorine, methyl, alkoxy of 1 to 4 carbon atoms or —NHCOR, R is hydrogen or alkyl of 1 to 6 carbon atoms, $R^1$ is hydrogen, alkyl of 1 to 6 carbon atoms, alkenyl of 3 to 5 carbon atoms, —$(CH_2)_nOR^3$ or —$(CH_2)_2CN$, $R^2$ is alkyl of 1 to 6 carbon atoms, alkenyl of 3 to 5 carbon atoms, cyclopentyl, cyclohexyl, —$(CH_2)_mCN$ or —$(CH_2)_mOR^4$, $R^3$ and $R^4$ are each alkyl of 2 to 6 carbon atoms or alkenyl of 3 to 5 carbon atoms, and n and m are each 2, 3 or 4, or a mixture of such dyes with or without the addition of other dyes.

* * * * *

UNITED STATES PATENT AND TRADEMARK OFFICE
CERTIFICATE OF CORRECTION

PATENT NO. : 5,093,307
DATED : March 3, 1992
INVENTOR(S) : KUNZ ET AL.

It is certified that error appears in the above-identified patent and that said Letters Patent is hereby corrected as shown below:

COLUMN 15

Lines 59-60, claim 1, delete "$-[-(CH)_2C-N]-(CH_2)_nCN$" and insert: -- $-(CH_2)_n \, OR^3$ or $-(CH_2)_nCN$, --.

Signed and Sealed this

Twenty-third Day of November, 1993

Attest:

*Attesting Officer*

BRUCE LEHMAN

*Commissioner of Patents and Trademarks*